(12) United States Patent
Kim et al.

(10) Patent No.: US 7,570,804 B2
(45) Date of Patent: Aug. 4, 2009

(54) APPARATUS AND METHOD FOR DETERMINING STEREO DISPARITY BASED ON TWO-PATH DYNAMIC PROGRAMMING AND GGCP

(75) Inventors: Jae-Chul Kim, Daejon (KR); Chang-Woo Chu, Daejon (KR); Bon-Ki Koo, Daejon (KR); Byoung-Tae Choi, Daejon (KR); Hyun-Bin Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 561 days.

(21) Appl. No.: 11/296,788

(22) Filed: Dec. 7, 2005

(65) Prior Publication Data

US 2006/0120594 A1   Jun. 8, 2006

(30) Foreign Application Priority Data

Dec. 7, 2004   (KR) .................... 10-2004-0102664

(51) Int. Cl.
| | |
|---|---|
| G06K 9/00 | (2006.01) |
| G06T 15/00 | (2006.01) |
| G06T 17/00 | (2006.01) |
| G06T 15/40 | (2006.01) |
| G06T 15/30 | (2006.01) |
| G06T 17/20 | (2006.01) |
| G06T 15/50 | (2006.01) |
| G06T 15/60 | (2006.01) |
| G06T 15/10 | (2006.01) |
| G06T 15/20 | (2006.01) |
| G01C 3/00 | (2006.01) |
| G01C 5/00 | (2006.01) |

(52) U.S. Cl. ............. 382/154; 345/419; 345/420; 345/421; 345/422; 345/423; 345/424; 345/426; 345/427; 356/12; 356/13; 356/14; 356/15; 356/16; 356/17; 356/18; 356/19; 356/20; 356/21; 356/22

(58) Field of Classification Search .......... 382/154
See application file for complete search history.

(56) References Cited

U.S. PATENT DOCUMENTS 4,197,583 A * 4/1980 Westell et al. .......... 382/264

(Continued)

OTHER PUBLICATIONS

D. Scharstein and R. Szeliski. A Taxonomy and evaluation of dense two-frame stereo correspondence algorithms. Technical Report MSR-TR-2001-81, Microsoft Research, 2001.*

(Continued)

Primary Examiner—Vikkram Bali
Assistant Examiner—Michelle Entezari
(74) Attorney, Agent, or Firm—Ladas & Parry LLP

(57) ABSTRACT

Provided is an apparatus and method for determining stereo disparity based on two-path dynamic programming and GGCP. The apparatus includes a pre-processing unit for analyzing texture distribution of an input image by using a Laplacian of Gaussian (LOG) filter and dividing the input image into a homogeneous region and a non-homogeneous region; a local matching unit for determining candidate disparities to be included in an each pixel of all pixels; a local post-processing unit for removing candidate disparities in a pixel of low reliability by performing a visibility test betweens candidate disparities in each pixel to improve the reliability of the candidate disparity; and a global optimizing unit for determining a final disparity for candidate disparities in an each pixel by performing a dynamic programming.

15 Claims, 6 Drawing Sheets

U.S. PATENT DOCUMENTS

| | | | | |
|---|---|---|---|---|
| 5,617,459 | A * | 4/1997 | Makram-Ebeid et al. | 378/62 |
| 5,691,773 | A * | 11/1997 | Wang et al. | 348/249 |
| 5,917,936 | A * | 6/1999 | Katto | 382/154 |
| 6,009,190 | A * | 12/1999 | Szeliski et al. | 382/154 |
| 6,076,010 | A * | 6/2000 | Boas et al. | 600/477 |
| 6,457,032 | B1 * | 9/2002 | Silver | 708/315 |
| 6,571,024 | B1 * | 5/2003 | Sawhney et al. | 382/294 |
| 6,591,004 | B1 * | 7/2003 | VanEssen et al. | 382/154 |
| 6,701,005 | B1 * | 3/2004 | Nichani | 382/154 |
| 6,744,923 | B1 * | 6/2004 | Zabih et al. | 382/226 |
| 6,954,544 | B2 * | 10/2005 | Jepson et al. | 382/107 |
| 6,999,620 | B1 * | 2/2006 | Harville | 382/173 |
| 7,004,904 | B2 * | 2/2006 | Chalana et al. | 600/443 |
| 7,085,409 | B2 * | 8/2006 | Sawhney et al. | 382/154 |
| 7,292,735 | B2 * | 11/2007 | Blake et al. | 382/275 |
| 7,330,584 | B2 * | 2/2008 | Weiguo et al. | 382/154 |
| 7,365,731 | B2 * | 4/2008 | Chiu et al. | 345/103 |
| 2002/0025075 | A1 | 2/2002 | Jeong et al. | |
| 2002/0097459 | A1 * | 7/2002 | Hart | 359/35 |
| 2004/0264763 | A1 * | 12/2004 | Mas et al. | 382/154 |
| 2005/0089199 | A1 * | 4/2005 | Marschner et al. | 382/118 |
| 2006/0056029 | A1 * | 3/2006 | Ye | 359/578 |
| 2006/0061583 | A1 * | 3/2006 | Spooner et al. | 345/582 |
| 2006/0104542 | A1 * | 5/2006 | Blake et al. | 382/284 |
| 2006/0120594 | A1 * | 6/2006 | Kim et al. | 382/154 |

OTHER PUBLICATIONS

Comparison of graph cuts with belief propagation for stereo, using identical MRF parameters, Tappen, M.F., Freeman, W.T., Comput. Sci. & Artificial Intelligence Lab., Massachusetts Inst. of Technol., Cambridge, MA, USA; Computer Vision, 2003. Proceedings. Ninth IEEE International Conference on Publication Date: Oct. 13-16, 2003 p. 900-906 vol. 2.*

"Sampling the Disparity Space Image" (IEEE Transactions on Patten Analysis and Machine Intelligence, vol. 25, No. 3, Mar. 2004, Szeliski and Scharstein).*

Y. Boykov, O. Veksler and R. Zabih, "Fast approximate energy minimization via graph cuts", IEEE Trans. On Pattern Analysis and Machine Intelligence, vol. 23, No. 11, pp. 1222-1239, 2001.*

P. Fua, "A parallel stereo algorithm that produces dense depth maps and preserves image features", Machine Vision and Applications, pp. 35-49, 1993.*

M.L. Gong and Y.H. Yang, "Fast stereo matching using reliability-based dynamic programming and consistency constraints", In Proc. Int. Conf. on Computer Vision, pp. 610-617, 2003.*

S.B. Kang, R. Szeliski, "Extracting view-dependent depth maps from a collecting of images", International Journal of Computer Vision, 58(2), pp. 139-163, Jul. 2004. [12] M. Kass, "Computing visual correspondence", In Proc. Image Understanding Workshop, pp. 54-60, Jun. 1983.*

M. Okutomi, Y. Katayama and S. Oka, "A simple stereo algorithm to recover precise object boundaries and smooth surfaces", International Journal of Computer Vision, 47(1/2/3), pp. 261-273, 2002.*

Y. Wei and L. Quan, "Region-based progressive stereo matching", In Proc. Conf. on Computer Vision and Pattern Recognition, vol. 1, pp. 106-113, 2004.*

T.E. Zickler, J. Ho, D.J. Kriegman, J. Ponce, and P.N. Belhumeur, "Binocular Helmholtz stereopsis", In Proc. Int. Conf. on Computer Vision, vol. 2, pp. 1411-1417, 2003.*

Jae Chul Kim et al., A Dense Stereo Matching Using Two-Pass Dynamic Programming with Generalized Ground Control Points Proceedings of the 2005 IEEE Computer Society Conference on Computer Vision and Pattern Recognition (CVPR'05)—vol. 2-vol. 02 pp. 1075-1082.*

Edgar Arce et al., "High-precision stereo disparity estimation using HMMF models Image and Vision Computing" vol. 25, Issue 5 (May 2007) pp. 623-636 Year of Publication: 2007.*

Stereo by Intra- and Inter-Scanline Search Using Dynamic Programming Y. Ohta and T. Kanade IEEE Trans. Pattern Analysis and Machine Intelligence, vol. PAMI-7, No. 2, Mar. 1985, pp. 139-154.*

Jones, D.G. et al, "A Computational Framework for Determining Stereo Correspondence from a Set of Linear Spatial Filters," European Conference on Computer Vision, 1992, pp. 395-410.

Intille, S.S. et al, "Large Occlusion Stereo," In Vismod, 1999.

* cited by examiner

FIG. 5 initialize the matching cost to infinite: $C(x,y,d) = \text{inf}$, for all $x,y,d$
for $i=1$ to n   //n: the number of filters
   for $x=1$ to w   //w: image width
     for $y=1$ to h   //h: image height
       for $d=1$ to $d_{max}$   //$d_{max}$ : maximum disparity range
$$C_1(x,y,d) = \sum_{-m_i \leq m \leq m_i} \sum_{-n_i \leq n \leq n_i} f_i(x-m, y-n) \cdot C_0(x-m, y-n, d)$$
         // $m_i$ : width of filter $f_i$, $n_i$ : height of filter $f_i$
       end for $d$
       $d_i = \arg\min_{d} C_1(x,y,d)$   //candidate disparity provided by $f_i$
       $v_i = C_1(x,y,d_i)$   //matching cost at the candidate disparity $d_i$
       if $C(x,y,d_i) > v_i$
          $C(x,y,d_i) = v_i$   //update the matching cost at the candidate disparity $d_i$
       end if
     end for $y$
   end for $x$
end for $i$

FIG. 6

```
// At the scanline y = y₁
for d = 1 to d_max   // d_max : maximum disparity range
    C_h1(1,d) = C(1,d)   // initialization of C_h1, C : locally aggregated cost
end for d
for x = 2 to w   // left to right, w : image width
    for d = 1 to d_max   // compute C_h1 at each disparity
        if (E_min(x−1) + λ(x)ρ(d_min(x−1)−d) < C_h1(x−1,d))
            C_h1(x,d) = E_min(x−1) + λ(x)ρ(d_min(x−1)−d) + C(x,d)
        else
            C_h1(x,d) = C_h1(x−1,d) + C(x,d)
        end if-else
    end for d
end for x
for d = 1 to d_max
    C_h2(w,d) = C(w,d)   // initilization of C_h2
    C_h(w,d) = C_h1(w,d) + C_h2(w,d)   //computation of C_h = C_h1 + C_h2
end for d
for x = w−1 to 1   // right to left
    for d = 1 to d_max   // compute C_h2 at each disparity
        if (E_min(x+1) + λ(x)ρ(d_min(x+1)−d) < C_h2(x+1,d))
            C_h2(x,d) = E_min(x+1) + λ(x)ρ(d_min(x+1)−d) + C(x,d)
            C_h(x,d) = C_h1(x,d) + C_h2(x,d)   //computation of C_h = C_h1 + C_h2
        else
            C_h2(x,d) = C_h2(x+1,d) + C(x,d)
            C_h(x,d) = C_h1(x,d) + C_h2(x,d)   //computation of C_h = C_h1 + C_h2
        end if-else
    end for d
end for x
```

APPARATUS AND METHOD FOR DETERMINING STEREO DISPARITY BASED ON TWO-PATH DYNAMIC PROGRAMMING AND GGCP

FIELD OF THE INVENTION

The present invention relates to an apparatus and method for determining a stereo disparity based on two-path dynamic programming and candidate disparities of each pixel; and, more particularly, to an apparatus and method for determining a stereo disparity based on a generalized ground control point (GGCP) and a two-path dynamic programming, wherein candidate disparities for each pixel is calculated by local filtering using multiple-sized oriented filters, and an accurate stereo matching result is obtained by adapting the calculated candidate disparity to the two-path dynamic programming.

DESCRIPTION OF RELATED ART

A stereo matching relates to correlation between each pixels in at least two still images. The calculated correlation is represented as an image, which is called as a disparity map.

A purpose of the stereo matching is to obtain a disparity map in which a boundary between objects is definitely distinctive and continuity in the inside of the object is maintained. The stereo matching is a core process to be adapted to various application fields such as an image-based rendering, an image-based modeling and an automatic navigation. The stereo matching has been actively studied and rapidly improved in a computer vision field.

However, the stereo matching has still difficult problems to be solved. One of them is little change of texture in a region of an image, and another is a boundary between objects.

To solve the problems, it is tried to remove matching ambiguity in the region having a low matching reliability result in the region having a high matching reliability region.

This method is called as "reliability-based progressive matching scheme". To determine a pixel having a high matching reliability is the most important thing in the reliability-based progressive matching scheme. Hereinafter, a pixel having a high matching reliability is called as "Ground Control Point (GCP)".

However, the use of the GCP may have problems such as below.

The first one is "Early Decision" problem. In general, back-tracking of a matching result is not occurred in the reliability-based progressive matching scheme. That is, the matching result determined at once is fixed and influences on next matching process. Accordingly, if a matching result of the GCP, a start point of a reliability-based progressive, is incorrect, the accuracy of a final matching result can be remarkably deteriorated.

The second one is "incomplete information" problem. If the GCP is determined under a strongly limited condition in order to improve the accuracy of GCP, the number of GCP is decreased and incomplete information is adapted to the next matching process.

SUMMARY OF THE INVENTION

It is, therefore, an object of the present invention to provide an apparatus and method for determining a stereo disparity based on a generalized ground control point (GGCP) and a two-path dynamic programming which provides efficient and reliable matching result.

In accordance with an aspect of the present invention, there is provided an apparatus for determining a stereo disparity, comprising: a pre-processing means for analyzing texture distribution of an input image and dividing the input image into a homogeneous region and a non-homogeneous region; a local matching means for determining candidate disparities of each pixel in the input image; a local post-processing means for removing candidate disparities in a pixel of low reliability by performing a visibility test between candidate disparities in each pixel to improve the reliability of the candidate disparities; and a global optimizing means for determining a final disparity among candidate disparities in an each pixel by performing a two-path dynamic programming.

In accordance with an aspect of the present invention, there is provided a method for determining a stereo disparity, the method comprising the steps of: a pre-processing for analyzing texture distribution of an input image and dividing the input image into a homogeneous region and a non-homogeneous region; a local matching for determining candidate disparities of each pixel in the input image by applying different matching method and filter in accordance with the homogeneous region and the non-homogeneous region; a local post-processing for removing candidate disparities in a pixel of low reliability by performing a visibility test between candidate disparities in each pixel to improve the reliability of the candidate disparity; and a global optimizing for determining a final disparity from candidate disparities in an each pixel by performing a two-path dynamic programming.

Other objects and advantages of the invention will be understood by the following description and become more apparent from the embodiments in accordance with the present invention, which is set forth hereinafter. It will be also apparent that objects and aspects of the invention can be embodied easily by the means defined in the claims and combinations thereof.

BRIEF DESCRIPTION OF THE DRAWINGS

The above and other objects and features of the present invention will become apparent from the following description of the preferred embodiments given in conjunction with the accompanying drawings, in which:

FIG. 5 shows a pseudo code illustrating a local matching process in accordance with an embodiment of the present invention; and FIG. 6 shows a pseudo code illustrating a horizontal optimization process in accordance with an embodiment of the present invention.

DETAILED DESCRIPTION OF THE INVENTION

Figure 1:
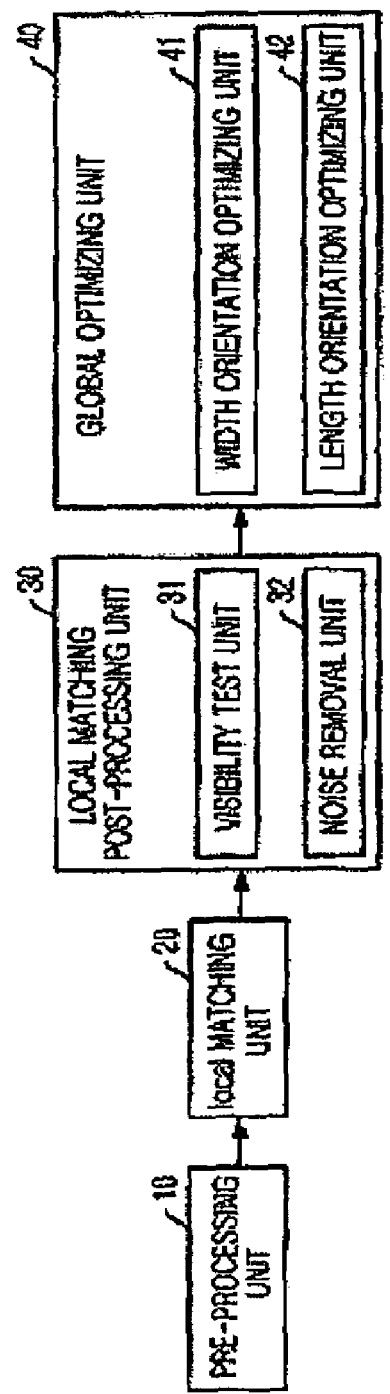
FIG. 1 is a block diagram showing an apparatus for determining a stereo disparity in accordance with an embodiment of the present invention.

In the present invention, 'Generalized Ground Control Point (GGCP)' concept is proposed to solve conventional GCP problems.

In the conventional GCP method, a pixel having a high matching reliability is detected, and a single disparity for only the detected pixel is determined.

On the other hand, in the GGCP method, multiple candidate disparities for each pixel are determined. Accordingly, in the GGCP method, one disparity is given to pixel having a high matching reliability, and at least two disparities are given as the candidate disparities to a pixel having a low matching reliability.

Therefore the GGCP is scheme generalizing a conventional GCP that determines a disparity for a high reliability pixel.

A characteristic of the GGCP has merits such as below.

Firstly, "Early Decision" problem is relieved. Since, contrary to the conventional GCP, the GGCP provides at least one candidate disparity for each pixel, the probability of a false matching is low in the GGCP.

In the GGCP method, to determine candidate disparities for each pixel and be endowed with a matching cost for the determined candidate disparities are performed by using a local filtering algorithm based on texture distribution analysis.

Details of a filtering algorithm will be described following.

The GCP or the GGCP can be combined with various matching method, e.g., a global optimization, a progressive scheme, or a local update scheme. In the present invention, it is described a case that a calculated GGCP is adapted to a matching method using the global optimization.

This global optimization is classified into one-dimensional optimization for optimizing scan-line of an image based on a dynamic programming and two-dimensional optimization for optimizing a whole image.

One-dimensional scan-line optimization performs efficient calculation in the dynamic programming, but it is difficult to obtain rectification between the scan-lines.

Two-dimensional optimization has merits, optimization for a whole image, but since the two-dimensional optimization is a NP-hard problem, it performs a lot of computation, and does not guarantee to provide a global minimum.

However, "Graph-cuts" algorithm and "belief propagation" algorithm, which correctly and rapidly approximate a solution of two-dimensional Markov Random Field (MRF) problem as compared to conventional two-dimensional optimization algorithm, is adapted to the stereo matching to improve matching performance.

Most algorithms supplying optimum matching result use "Graph-cuts" or "Belief-propagation", however, a dynamic programming is used as an optimizing method in the present invention. The reason adopting the dynamic programming is described following.

In the present invention, a disparity search region in an optimizing process is reduced and reliable initial points for optimizing are provided.

The present invention can rapidly obtains the matching result as accurate as the matching result obtained based on "Graph-cuts" or "Belief propagation" by using the dynamic programming having a small quantity of computation.

Moreover, the present invention solves a typical problem of the dynamic programming, discontinuity of the scan lines based on a two-path dynamic programming which performs both of horizontal and vertical matching.

Accordingly, the present invention performs more efficient computation and provides accurate matching results as the same as two-dimension optimizing method based on a dynamic programming method combined with merits of the GGCP.

Subsequently, characteristic of the present invention will be described following.

Firstly, the GGCP obtained by a local matching is applied to a global optimization.

A method combining a local matching and a global matching is tried in a conventional stereo matching field. In particular, a conventional algorithm proposed by Bobick is similar to an algorithm combining a dynamic programming and GGCP obtained by a local matching. However, the algorithm in accordance with the present invention improves performance by using the GGCP that generalizes the GCP and the two-path dynamic programming performed in both of horizontal and a vertical.

Secondary, the present invention performs a local matching by using an oriented filtering for calculating the GGCP.

The oriented filtering is used in various fields of a computer vision and an image processing such as an optical flow, a texture analysis, a grouping of curves and an edge detection.

Being compared with a window method generally used in local stereo matching, an oriented filter in accordance with the present invention has merits such as below.

Matching of depth discontinuities having various orientations is accurate in the oriented filter.

The oriented filter has an advantage in matching of a slanted plane. A basic assumption of the local matching is to have the same disparity in all pixels of a filter (fronto-parallel plane assumption).

However, this assumption cannot be completed in a case that a window is applied to a slanted plane. This assumption can be completed in at least one orientation where an oriented filter is applied to the slanted plane. Since the matching cost in the orientation satisfied with the assumption is much smaller than in other orientation, the matching is performed more correctly in the slanted plane.

In the present invention, an oriented filter has a different shape from the conventional oriented filter in order to improve matching correctness. Namely, Kass and Jones et al teach use of difference of Gaussian (DOG) filter after Gaussian filtering. In the present invention, a rod-shaped filter is used after Gaussian filtering.

Since coefficients of the rod-shaped filter concentrate on the filtering orientation in compared with the difference of Gaussian (DOG) filter, the rod-shaped filter has high orientation resolution and can match boundaries of objects more correctly.

Thirdly, in the present invention, two-path dynamic programming, which performs both of horizontal and vertical matching, is used for solving a discontinuity problem between scan lines in a dynamic programming process.

In the present invention, a global optimization is performed based on not a conventional dynamic programming applying ordering constraint but a scan line optimization.

Since the scan line optimization does not use ordering constraint, the vertical optimization can be performed as the same as a horizontal optimization.

In the present invention, two-path dynamic programming method, which is properly modified to be applied to a stereo problem, is performed. In particular, the present invention can obtain rectification of scan lines by performing the two-path dynamic programming based on information obtained from the GGCP.

Other objects and aspects of the invention will become apparent from the following description of the embodiments with reference to the accompanying drawings, which is set forth hereinafter.

FIG. 1 is a block diagram showing an apparatus for determining a stereo disparity in accordance with an embodiment of the present invention.

As shown in FIG. 1, an apparatus for determining a stereo disparity based on a two-path dynamic programming and candidate disparities in accordance with an embodiment of the present invention includes a pre-processing unit 10, a local matching unit 20, a local matching post-processing unit 30 and a global optimizing unit 40.

The pre-processing unit 10 analyzes texture distribution of an image by applying Laplacian of Gaussian (LOG) filter, and divides the image into a homogeneous region and a non-homogeneous region.

The local matching unit 20 determines candidate disparities for each pixel in the image. The local matching unit 20 obtains candidate disparities for each pixel by applying an oriented filter and large size window to the pixels in a homogeneous region and applying an oriented filter to the pixels in a non-homogeneous region, and applying Winner Take All (WTA) to aggregation results of each filter.

The local matching post-processing unit 30 removes the candidate disparity for a pixel having a low reliability by performing a visibility test between the candidate disparities in each pixel in order to improve reliability of the candidate disparity.

The global optimizing unit 40 determines final disparity by performing a dynamic programming for the candidate disparity for the each pixel.

At this time, since the dynamic programming has the candidate disparity and the reliable matching cost for candidate disparity for each pixel by calculating a generalized ground control point (GGCP) based on a local filtering process before the global optimizing unit 40, the dynamic programming having difficulty in calculation efficiency and rectification between scan lines is used in the present invention.

Moreover, the global optimizing unit 40 solves discontinuities of scan lines, which is a typical problem of the dynamic programming, by using the two-path dynamic programming that performs both of horizontal and vertical matching.

Figure 2:
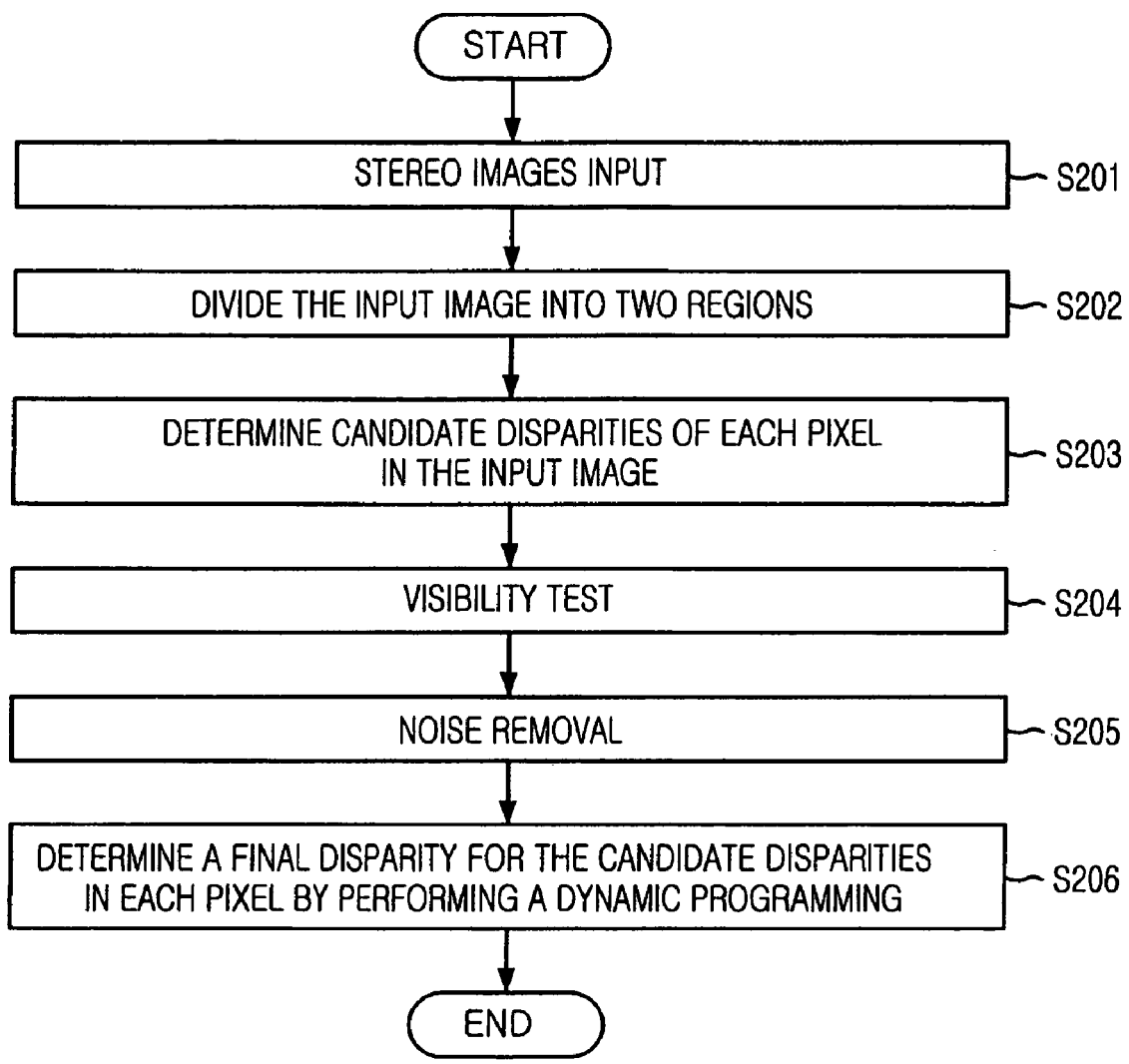
FIG. 2 is a flow chart showing a method for determining a stereo disparity based on candidate disparity and two-path dynamic programming in accordance with an embodiment of the present invention.

FIG. 2 is a flow chart showing a method for determining a stereo disparity based on candidate disparity and a two-path dynamic programming in accordance with an embodiment of the present invention.

Referring to FIG. 2, a method for determining a stereo disparity based on candidate disparities and a two-path dynamic programming is described as below.

For easy description, rectification of scan lines in the input image is assumed. Absolute Differences (AD), Squared differences (SD) and Normalized correlation (NC) are used to measure similarity between $I_1(x,y)$, which is a pixel of a first input image, and $I_2(x-d,y)$, which is a pixel of a second input image having a disparity d from the $I_1(x,y)$. In the present invention, an initial matching cost is calculated based on the AD.

$C_0(x,y,d)=|I_1(x,y)-I_2(x-d,y)|$ is an initial matching cost of a point (x,y,d) of disparity space image (DSI).

Figure 3:
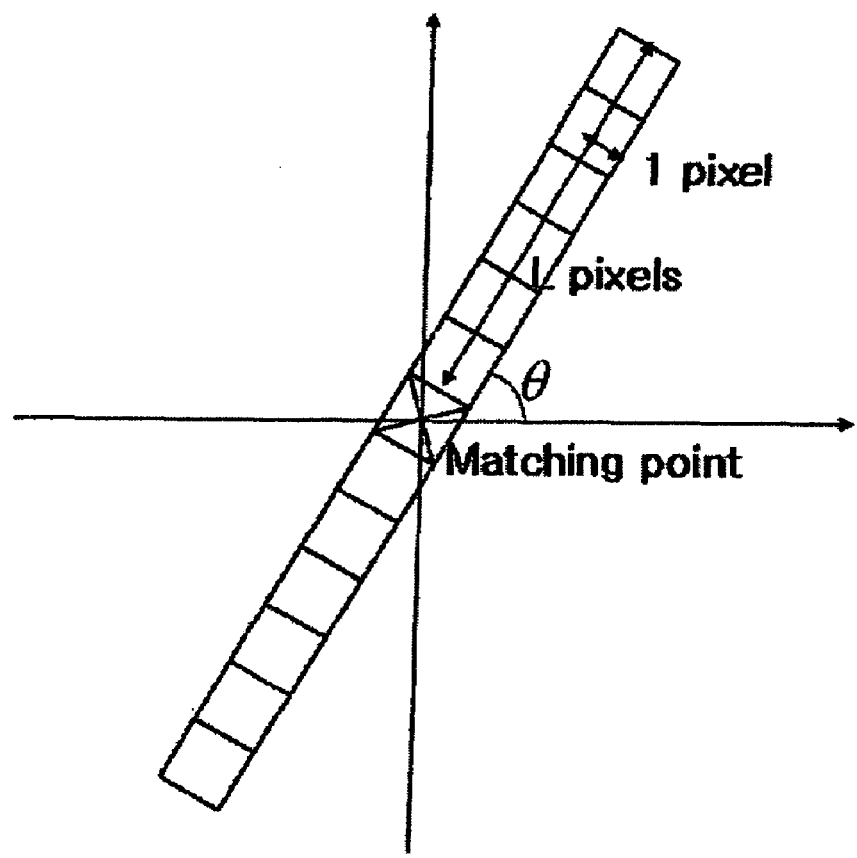
FIG. 3 shows an orientated filter in accordance with an embodiment of the present invention.

FIG. 3 shows an oriented filter in accordance with an embodiment of the present invention. The rod-shaped oriented filter as shown in FIG. 3 is used in an embodiment of the present invention. The rod-shaped oriented filter shown in FIG. 3 is slanted as much as θ, and the width of a filter is 3 pixels, and the length of a filter is 2l+1 pixels. The rod-shaped oriented filter shown in FIG. 3 is expressed as equation 1.

$$f_\theta(x, y) = \begin{cases} 1 - |x\sin\theta - y\cos\theta| & \text{if} |x\sin\theta - y\cos\theta| < 1, |x| < l\cos\theta \text{ and } |y| < l\sin\theta \\ 0 & \text{otherwise.} \end{cases} \quad \text{Eq. (1)}$$

In the present invention, to minimize a problem that the oriented filtering is performed at a boundary of an object, a center of filter is shifted into a different three location and the filtering is performed and best cost is obtained. This method is called as "shiftable filtering".

Figure 4:
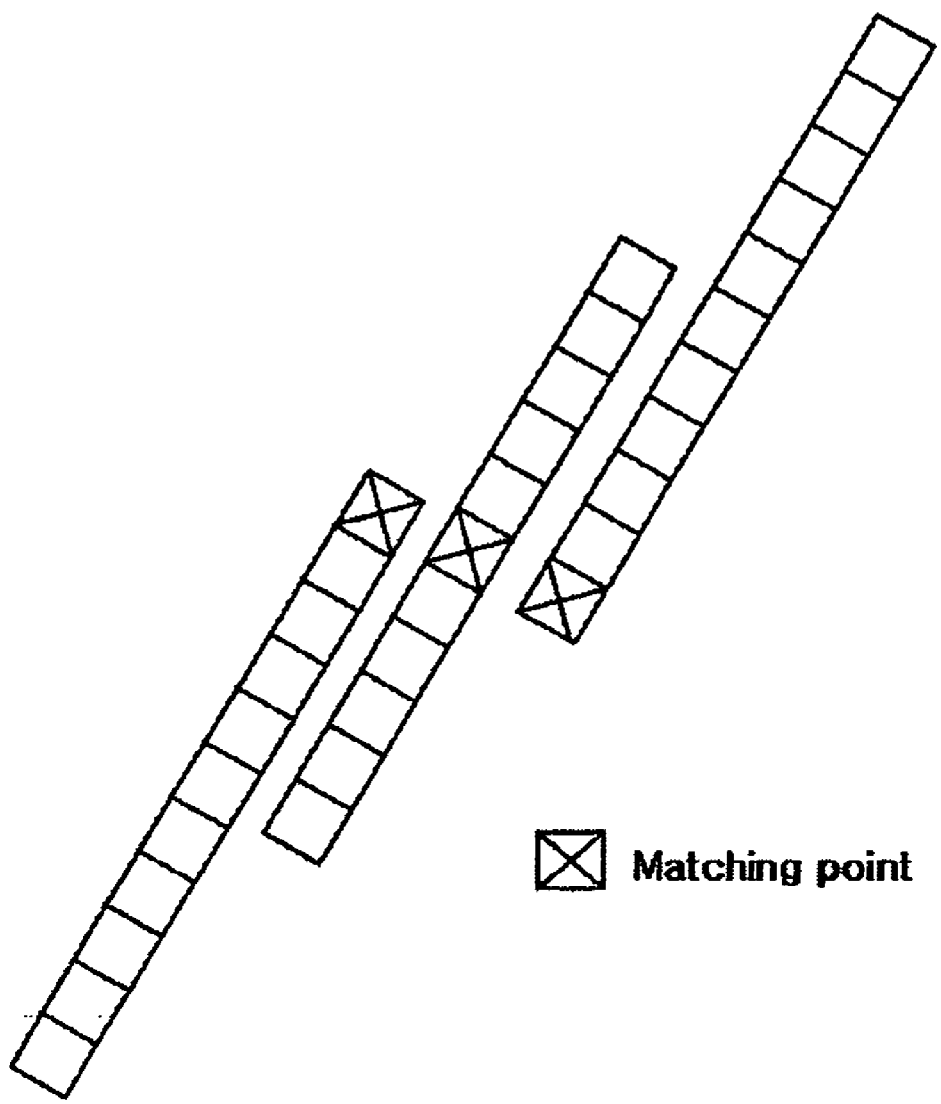
FIG. 4 shows three shiftable oriented filters in accordance with an embodiment of the present invention.

FIG. 4 shows three shiftable oriented filters in accordance with an embodiment of the present invention.

These shiftable oriented filtering calculates a minimum value among center points of the filters after performing each oriented filter instead of repeating the filtering for the center of the each oriented filter. Thus, the shiftable oriented filtering is embodded by adding a little amount of computation.

Two stereo images inputted at step S201 are pre-processed by the pre-processing unit 10 at step 202. A purpose of the pre-processing is to divide the inputted stereo images into a homogeneous region and a non-homogeneous region by analyzing change of intensity value of a base image $I_1$.

The pre-processing step S202 will be described in detail as below.

Change of intensity value in each pixel of the image is calculated by adapting a Laplacian of Gaussian (LOG) filter having a small size e.g., 3×3 or 5×5 to the base image $I_1$, to thereby generate an LOG filtered image. The change of intensity value in a neighboring pixel is matched together by adapting the shiftable oriented filter as shown in FIG. 4 to the image filtered LOG.

The shiftable oriented filter is used to provide the pre-processing step S202 with the change of intensity value in filter to be applied in real matching.

Then, if all filtering values provided from the filters are smaller than a threshold value, it is determined that the corresponding pixel is in a homogeneous region. If all filtering values provided from the filters are not smaller than the threshold value, it is determined that the corresponding pixel is in a non-homogeneous region.

Then, the pre-processed image is transmitted to the local matching unit 20. The local matching unit 20 determines candidate disparities to be included in each pixel at step S203.

A purpose of the local matching step S203 is to embody the GGCP. In the local matching unit 20, different matching methods are used for two regions divided in the pre-processing step. The difference between the matching methods will described hereinafter.

First, a method for calculating an initial matching cost $C_0(x,y,d)$ from the input image is different. In homogeneous region, the initial matching cost is calculated based on the input image. In non-homogeneous region, the initial matching cost is calculated after reducing image noise by performing a Gaussian filtering of the input image. The homogeneous region is more influenced by image noise than the non-homogeneous region.

Second, different filters are used in aggregation of initial matching cost. In non-homogeneous region, a shiftable oriented filter is used. On the contrary, in homogeneous region, a shiftable oriented filter and large shiftable windows are used together.

The large shiftable window is used to remove ambiguity of matching due to lack of information on intensity value.

A detailed local matching step S203 will be described hereinafter.

The initial matching cost is expressed as the equation 2.

$$C_0(x, y, d) = \begin{cases} |I_1(x, y) - I_2(x-d, y)| & \text{if } I_1(x, y) \in \text{homogeneous} \\ |g \otimes I_1(x, y) - g \otimes I_2(x-d, y)| & \text{otherwise,} \end{cases} \quad \text{Eq. (2)}$$

Where g denotes a Gaussian filter and $g \otimes I_i (i=1,2)$ means a convolution operation between a Gaussian filter and an input image.

If the initial matching cost is calculated based on the equation 2, a local matching is performed by the shiftable oriented filter, and a disparity having the minimum matching cost is calculated for each pixel.

The disparity having the minimum matching cost provided from the each filter is candidate disparities of the corresponding pixel, and the matching cost of the calculated disparity is the matching cost of the candidate disparity.

If the candidate disparities provided from different filters are the same, the matching cost of the corresponding candidate disparity is determined as the minimum value of the matching cost provided from each filter.

FIG. 5 shows a pseudo code illustrating a local matching process in accordance with an embodiment of the present invention.

Meanwhile, a local matching post-processing unit 30 performs two kinds of post-processing steps S204 and S205.

One post-processing is performed in a visibility test unit 31 and the other post-processing is performed in a noise removal unit 32.

The visibility test unit 31 performs a visibility test in order to increase reliability of the local matching result. The visibility test is performed by acknowledging two-path rectification of the matching result based on uniqueness assumption.

In the present invention, the ambiguity of the matching result, which is occurred by half-occlusion, can be removed by the visibility test.

The visibility test step S204 will be described hereinafter.

A first minimum disparity range $d_{min1}$ providing the minimum matching cost for the pixel $I_1(x,y)$ of a base image, is calculated, and a second disparity range $d_{min2}$, providing the minimum matching cost for the pixel $I_2(x-d_{min1},y)$ of an image opposite to the base image is calculated.

If $d_{min1} \neq d_{min2}$, the pixel $I_1(x,y)$ is not satisfied with the uniqueness assumption, and a local matching result for $I_1(x, y)$ is invalidated.

The invalidation of the matching result is performed by assigning a predetermined value to the matching cost of the candidate disparity of $I_1(x,y)$ and removing the difference of local matched results.

The matching cost of the candidate disparity is assigned as a predetermined value 0 in the present invention. The matching cost except the candidate disparity is infinite.

In the invalidation method, the candidate disparity is distinguished from the other candidate disparities, however the difference between candidate disparities is ignored based on heuristics based on following reason.

In a half-occluded pixel, the disparity of true value exits in the candidate disparity. However, a matching cost of the candidate disparity of the corresponding pixel can be unreliable. Namely, since the matching cost of the disparity of the true value is much larger than the matching cost of the different candidate disparity, if a global optimizing is performed based on a local matching cost, incorrect matching result is generated.

Accordingly, the noise removal unit 32 invalidates the local matching results of the pixel by detecting incorrectly matched pixels due to excessive lack of intensity value information or specularity violating Lambertian assumption at step S205.

The invalidation of the matching result is similar to the invalidation in the visibility test step S204. In the visibility test step S204, the candidate disparity is classified from the other disparities and the other disparities are invalidated, however in the noise removal step S205, the matching result of all disparities are invalidated.

The invalidation ignoring the candidate disparity information is proposed based on experimental experience that true value disparity of pixels detected in local matching post-processing steps S204 and S205 does not always exist in candidate disparities, which occurs often.

The validation in the local matching post-processing step S204 and S205 will be described in detail.

If the difference between the first minimum matching cost and the second minimum matching cost, which is obtained by adapting a large shiftable window for a pixel in a homogeneous region, is less than the threshold, it means that intensity information for matching is lack.

Accordingly, local matching results are invalidated by allotting the same value to the matching cost of the corresponding pixel regardless values of disparities. Certain matching cost is assigned as 0 in the present invention.

Next, if the minimum matching cost of the pixel $I_1(x,y)$ is larger than a predetermined value, the pixel to be falsely matched due to specularity. The local matched results of these pixels are invalidated by assigning the same value to the matching cost.

The pixels that the local matching results are invalidated in the local matching post-processing step S204 and S205 are matched based on smoothness between neighboring pixels in a global optimizing step S206.

Thus, at step S206 the global optimizing unit 40 determines a final disparity by combining the two-path dynamic programming with the candidate disparity provided by the local matching unit 20 and the local matching post-processing unit 30.

A horizontal optimizing unit 41 calculates a disparity path d which minimizes an energy function for each scan line $y=y_1$ and the energy function is expressed by equation 3.

$$E_h(d(x, y_1)) = \sum_x C(x, y_1, d(x, y_1)) + \sum_x \lambda(x, y_1) \rho(d(x, y_1) - d(x+1, y_1)) \quad \text{Eq. (3)}$$

where $C(x,y_1,d(x,y_1))$ means consistency between the input image and a disparity path d based on the matching cost calculated in the local matching step, p is a function measuring how the disparity path d satisfies continuity assumption and has a function value in proportion to disparity difference between neighboring pixels.

Potts model having a discontinuity of disparity is used in latest optimizing method. The Potts model is expressed by the equation 4.

$$\rho(x) = \begin{cases} 0 & x = 0 \\ 1 & x \neq 0 \end{cases} \qquad \text{Eq. (4)}$$

Optimizing method is performed with the Potts model in the present invention.

A reformed Potts model, which combines a disparity gradient constraint and the Potts model, is applied to pixels of which a local matched result is not invalidated, in the The reformed Potts model is expressed by the equation 5.

$$\rho'(x) = \begin{cases} 0 & \text{if } x = 0 \\ 0.5 & \text{if } x = 1 \text{ or } x = -1 \\ 1 & \text{otherwise.} \end{cases} \qquad \text{Eq. (5)}$$

where λ denotes a weight value applied to a term of continuity in the equation 3. The λ is often treated as a constant, however, in the latest, a different value is used as λ in the each pixel according to change of intensity of the input image.

In general, λ is in inverse proportion to difference of intensity between neighboring pixels and enables the depth discontinuity to be aligned with an edge of the image.

In this embodiment, λ is used for the horizontal optimization, and expressed by equation 6.

$$\lambda(x, y_1) = \begin{cases} 0.5c & \text{if } \nabla_h I_1(x, y_1) > t_2 \\ c & \text{if } t_1 < \nabla_h I_1(x, y_1) < t_2 \\ 2c & \text{otherwise,} \end{cases} \qquad \text{Eq. (6)}$$

Where c is a constant. $\nabla_h I_1(x,y_1)$ means an intensity gradient of a pixel $I_1(x,y)$ in the base image, and is calculated based on a horizontal Sobel operator of 3×3 size. $t_1$ and $t_2$ are threshold values for the intensity gradient.

A minimum matching cost $C_h(x,y_1,d)$ obtained by horizontal optimization is applied to a vertical optimization. The matching is completed by determining a final disparity in the vertical optimization.

Then, $C_h(x,y_1,d)$ is obtained by aggregating a cost $C_{h1}(x,y_1,d)$, which is a matching cost by performing optimization in left to right, and a cost $C_{h2}(x,y_1,d)$, which is a matching cost by performing optimization in right to left.

The vertical optimization of the scan line is described in details in similarity code shown in FIG. 6.

New notation in similarity code is expressed as following.

$$d_{\min}(x_1) = \underset{d}{\arg\min}\, C_h(x_1, y_1, d), \text{ and } E_{\min}(x_1) = C_h(x_1, y_1, d_{\min}(x_1)).$$

For only easy description, a fixed parameter $y_1$ is omitted in definition of notation and in FIG. 6. Candidate disparities are omitted and matching for all disparities are considered in the similarity code of FIG. 6.

Meanwhile, a vertical optimizing unit 42 calculates a disparity path d minimizing an energy function for each vertical scan line $x=x_1$, and the energy function is expressed by equation 7.

$$E_v(d(x_1, y)) = \sum_y C_h(x_1, y, d(x_1, y)) + \qquad \text{Eq. (7)}$$
$$\sum_y C(x_1, y, d(x_1, y)) + \sum_y \lambda(x_1, y)\rho(d(x_1, y) - d(x_1, y+1)),$$

where $C_h$ is a matching cost obtained from the horizontal optimization, and C is a matching cost obtained from a local matching. In vertical optimization, ρ and λ have different structure from those in horizontal optimization.

Since the Potts model adapted in the vertical optimization provides more accurate matched results than reformed Potts model and the Potts model adapted together, p uses the Potts model for all region of image.

λ is expressed as a following equation 8.

$$\lambda(x_1, y) = \begin{cases} 0.5c & \text{if } \nabla_v I_1(x_1, y) > t_2 \\ c & \text{if } t_1 < \nabla_v I_1(x_1, y) < t_2 \\ 2c & \text{otherwise,} \end{cases} \qquad \text{Eq. (8)}$$

Where c is a constant parameter and $t_1$, $t_2$ denote threshold values for the intensity gradient.

$\nabla_v I_1(x_1,y)$ is a horizontal intensity gradient of pixel $I_1(x,y)$ in the base image and calculated by a horizontal Sobel operator of 3×3 size.

In the vertical optimization, the optimization of the scan line is performed by considering the horizontal optimization results, the local matching results and the vertical disparity continuity Disparity map having rectification of scan lines is obtained.

Simple sub-pixel refinement is performed for the disparity map obtained from the vertical optimization. The sub-pixel refinement uses a local matching result. The sub-pixel refinement is performed through heuristic equation such as a following equation 9 in a case that difference between two candidate disparities obtained from the local matching is a pixel.

$$d_{sub}(x,y) = 0.75 d_0(x,y) + 0.25 d_1(x,y), \qquad \text{Eq (9)}$$

Where $d_0$ denotes a disparity value, which is selected by the optimization of the scan line, among candidate disparities, and $d_1$ denotes another disparity which is not selected, and $d_{sub}$ means a disparity value refined by sub-pixel.

As above-mentioned, the method of the present invention can be embodied as a program and stored in recording media readable by a computer, e.g., CD-ROM, RAM, floppy disk, hard disk, magneto-optical disk, etc.

The present application contains subject matter related to Korean Patent Application No. 2004-0102664, filed with the Korean Patent Office on Dec. 7, 2004, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for determining a stereo disparity, comprising:
   a pre-processing means for analyzing texture distribution of an input image and dividing the input image into a homogeneous region and a non-homogeneous region;

a local matching means for determining multiple candidate disparities of each pixel in the input image by calculating a Generalized Ground Control Point (GGCP);

a local post-processing means for removing candidate disparities in a pixel having a low reliability by performing a visibility test between the candidate disparities in each pixel to improve the reliability of the candidate disparity;

a global optimizing means for determining a final disparity among the candidate disparities in each pixel of the input image by performing a two path dynamic programming, wherein the two path dynamic programming includes both a horizontal matching and a vertical matching.

2. The apparatus as recited in claim 1, wherein the local matching means obtains candidate disparities for each pixel by applying a Winner Take All (WTA) to first matching results obtained by an oriented filter and a large window in a homogeneous region, and second matching results obtained by an oriented filter in a non-homogeneous region.

3. The apparatus as recited in claim 1, wherein the local matching means obtains a reliable matching cost for candidate disparities for each pixel in the input image by calculating the GGCP based on a local filtering process.

4. The apparatus as recited in claim 1, wherein the global optimizing means uses a two-path programming, which performs both vertical and horizontal optimization, to solve a discontinuity problem between scan lines of the dynamic programming.

5. The apparatus as recited in claim 3, wherein the local matching means performs a local matching with a filter, by calculating the matching cost and calculates a disparity having the minimum matching cost in each pixel based on the matched result, and the disparity having the minimum matching cost being the candidate disparity in a corresponding pixel, and a matching cost of the calculated disparity becomes a matching cost of the candidate disparity, when candidate disparities calculated by different filters are same, a matching cost of the corresponding candidate disparities is a minimum matching cost among the matching costs calculated by each filter.

6. The apparatus recited in claim 5, wherein the local matching means determines candidate disparities based on an oriented filter expressed as:

$$f_\theta(x, y) = \begin{cases} 1 - |x\sin\theta - y\cos\theta| & \text{if } |x\sin\theta - y\cos\theta| < 1, |x| < l\cos\theta \text{ and } |y| < l\sin\theta \\ 0 & \text{otherwise,} \end{cases}$$

wherein the local matching means calculates an initial matching cost in an initial matching cost calculation, where the initial matching cost is expressed as:

$$C_0(x, y, d) = \begin{cases} |I_1(x, y) - I_2(x-d, y)| & \text{if } I_1(x, y) \in \text{homogeneous} \\ |g \otimes I_1(x, y) - g \otimes I_2(x-d, y)| & \text{otherwise,} \end{cases}$$

and where g denotes a Gaussian filter and $g \otimes I_i (i=1,2)$ denotes a convolution operation between a Gaussian filter and an input image.

7. The apparatus as recited in claim 1, wherein the local post-processing means removes ambiguity of the matched result generated by half-occlusion by acknowledging two-path rectification of the matched result based on an uniqueness assumption, and detects pixels having unreliable matched results due to an over-redundancy of intensity information or specularity against Lambertian assumption, and invalidates local matched results of the detected pixels.

8. The apparatus as recited in claim 4, wherein the global optimizing means optimizes the horizontal scan line according to an equation:

$$E_h(d(x, y_1)) = \sum_x C(x, y_1, d(x, y_1)) + \sum_x \lambda(x, y_1)\rho(d(x, y_1) - d(x+1, y_1))$$

where $C(x, y_1, d(x, y_1))$ means consistency between the input image and a disparity path d based on the matching cost calculated in the local matching step, $\rho$ is a function measuring how the disparity path d satisfies continuity assumption and has a function value in proportion to a disparity difference between neighboring pixels, wherein the global optimizing means optimizes the vertical scan line according to an equation:

$$E_v(d(x_1, y)) = \sum_y C_h(x_1, y, d(x_1, y)) + \sum_y C(x_1, y, d(x_1, y)) + \sum_y \lambda(x_1, y)\rho(d(x_1, y) - d(x_1, y+1)),$$

where $C_h$ is a matching cost obtained from a horizontal optimization, and C is a matching cost obtained from a local matching, wherein in a vertical optimization, $\rho$ and $\lambda$ have different structure from those for horizontal optimization.

9. The apparatus as recited in claim 8, wherein the global optimizing means applies a reformed Potts model to pixels of the homogeneous region divided by the pre-processing means of which a local matched result is not invalidated, wherein the reformed Potts model combines a disparity gradient and a Potts model and is expressed as:

$$\rho'(x) = \begin{cases} 0 & \text{if } x = 0 \\ 0.5 & \text{if } x = 1 \text{ or } x = -1 \\ 1 & \text{otherwise.} \end{cases}$$

10. The apparatus recited in claim 8, wherein the global optimizing means obtains a disparity map having rectification of the scan lines by optimizing the scan line based on horizontal optimization, the local matched result, and vertical continuity of disparity.

11. A method for determining a stereo disparity, the method comprising:

a pre-processing step for analyzing texture distribution of an input image and dividing the input image into a homogeneous region and a non-homogeneous region;

a local matching step for determining multiple candidate disparities of each pixel in the input image by calculating a Generalized Ground Control Point (GGCP);

a local post-processing step for removing candidate disparities in a pixel having a low reliability by performing a visibility test between the candidate disparities in each pixel to improve the reliability of the candidate disparity; and a global optimizing step for determining a final disparity from the candidate disparities in each pixel by performing a two-path dynamic programming, wherein the two path dynamic programming includes both a horizontal matching and a vertical matching wherein the above steps are performed by a hardware unit.

12. The method as recited in claim 11, wherein the local matching step comprises:
    calculating an initial matching cost of the homogeneous region using both a shiftable oriented filter and a large shiftable window; and
    calculating an initial matching cost of the non-homogeneous region using a shiftable oriented filter after reducing noise in the input by performing a Gaussian filtering for the input image.

13. The method as recited in claim 11, wherein the global optimizing step comprises:
    providing a final disparity by using a two-path programming to solve a disparity problem between scan lines of the dynamic programming.

14. The method as recited in claim 11, wherein the local matching step comprises:
    calculating an initial matching cost in an initial matching cost calculation by determining candidate disparities with an oriented filter;
    calculating a matching cost by performing a local matching with a shiftable orientated filter; and
    calculating a disparity having a minimum matching cost in each pixel based on a matched result,
    wherein the disparity having the minimum matching cost becomes the candidate disparity in a corresponding pixel and a matching cost of the calculated disparity becomes a matching cost of the candidate disparity; and
    when candidate disparities calculated by different filters are the same, a matching cost of the corresponding candidate disparities is a minimum matching cost among the matching costs calculated by each filter, $$f_\theta(x, y) = \begin{cases} 1 - |x\sin\theta - y\cos\theta| & \text{if } |x\sin\theta - y\cos\theta| < 1, \ |x| < l\cos\theta \text{ and } |y| < l\sin\theta \\ 0 & \text{otherwise,} \end{cases}$$

wherein the initial matching cost calculation is expressed as:

$$C_0(x, y, d) = \begin{cases} |I_1(x, y) - I_2(x-d, y)| & \text{if } I_1(x, y) \in \text{homogeneous} \\ |g \otimes I_1(x, y) - g \otimes I_2(x-d, y)| & \text{otherwise,} \end{cases}$$

where g denotes a Gaussian filter and $g \otimes I_i (i=1,2)$ denotes a convolution operation between a Gaussian filter and an input image.

15. The method recited in claim 13, wherein the global optimizing step comprises:
    optimizing both horizontal and a vertical scan lines; and
    applying a reformed Potts model to pixels of the homogeneous region divided by the pre-processing step of which a local matched result is not invalidated,
    wherein the reformed Potts model combines a disparity gradient and a Potts model, and
    wherein the global optimizing steps optimizes the horizontal scan line according to an equation:

$$E_h(d(x, y_1)) = \sum_x C(x, y_1, d(x, y_1)) + \sum_x \lambda(x, y_1)\rho(d(x, y_1) - d(x+1, y_1))$$

where $C(x, y_1, d(x, y_1))$ denotes consistency between an input image and a disparity path d based on a matching cost calculated in the local matching step, and $\rho$ denotes a function for measuring how the disparity path d satisfies a continuity assumption,
wherein the global optimizing step optimizes the vertical scan line according to an equation:

$$E_v(d(x_1, y)) = \sum_y C_h(x_1, y, d(x_1, y)) + \sum_y C(x_1, y, d(x_1, y)) + \sum_y \lambda(x_1, y)\rho(d(x_1, y) - d(x_1, y+1)),$$

where $C_h$ is a matching cost obtained from an optimization of the horizontal scan line, and C is a matching cost obtained from a local matching, wherein an optimization of the vertical scan line, $\rho$ and $\lambda$ have different structure from those for optimization of the horizontal scan line, the reformed Potts model being expressed as:

$$\rho'(x) = \begin{cases} 0 & \text{if } x = 0 \\ 0.5 & \text{if } x = 1 \text{ or } x = -1 \\ 1 & \text{otherwise.} \end{cases}$$

\* \* \* \* \*